United States Patent [19]

Beam

[11] Patent Number: 5,368,370

[45] Date of Patent: Nov. 29, 1994

[54] VEHICLE WHEEL CONSTRUCTION

[75] Inventor: Jeffrey Beam, Plymouth, Mich.

[73] Assignee: Thompson International, Troy, Mich.

[21] Appl. No.: 116,712

[22] Filed: Sep. 3, 1993

[51] Int. Cl.$^5$ ................................................ B60B 7/06
[52] U.S. Cl. ................................ 301/37.36; 301/37.43
[58] Field of Search ................ 301/37.1, 37.27, 37.36, 301/37.42, 37.43, 64.2

[56] References Cited

U.S. PATENT DOCUMENTS

| | | | |
|---|---|---|---|
| 1,858,228 | 5/1932 | Lyon . | |
| 1,985,378 | 12/1934 | Lyon | 41/10 |
| 3,517,968 | 6/1970 | Tully et al. | 301/37 |
| 3,669,501 | 6/1972 | Derleth | 301/37 R |
| 3,918,762 | 11/1975 | Hampshire | 301/37 P |
| 4,251,476 | 2/1981 | Smith | 264/46.7 |
| 4,270,805 | 6/1981 | Spisak | 301/37 TP |
| 4,344,654 | 8/1982 | Apezynski | 301/37.1 |
| 4,530,542 | 7/1985 | Spiegel et al. | 301/37.1 |
| 4,659,148 | 4/1987 | Grill | 301/37.42 |
| 4,874,206 | 10/1989 | Sampson | 301/37.1 |
| 4,976,497 | 12/1990 | Post et al. | 301/37.1 |
| 5,031,966 | 7/1991 | Oakey | 301/37.1 |
| 5,098,272 | 3/1992 | Joseph | 425/127 |
| 5,128,085 | 7/1992 | Post et al. | 264/257 |
| 5,131,727 | 7/1992 | Johnson | 301/37.42 |
| 5,143,426 | 9/1992 | Todd | 301/37.42 |

FOREIGN PATENT DOCUMENTS 2813412 10/1979 Germany ................ 301/37.36

*Primary Examiner*—Russell D. Stormer
*Attorney, Agent, or Firm*—Reising, Ethington, Barnard, Perry & Milton

[57] ABSTRACT

A composite vehicular wheel assembly (10) has a permanent ornamental surface treatment. The wheel assembly (10) includes an annular rim (12) having two rim flanges (14). A spider (20) is fixed within the rim (12) and attaches to a rotating hub (22). The spider (20) includes a plurality of radial spokes (24). Lug stud holes (32) are formed in the spider (20) and are circumferentially spaced about a central axis of the assembly (10). A stamped sheet metal applique (34) conforming to the outer surface curvature of the rim (12) and spider (20) is adhesively attached with an epoxy (42). The applique (34) is chrome-plated to simulate a conventional prior art electroplate chrome wheel assembly. The applique (34) includes vent openings (40) positioned between the spokes (24) of the spider (20), and apertures (52) aligned over each of the lug stud holes (32) of the spider (20) for passage of tile lug studs (31). A separately detachable center cap (29) attaches to the spider (20) and/or the hub (22).

17 Claims, 2 Drawing Sheets

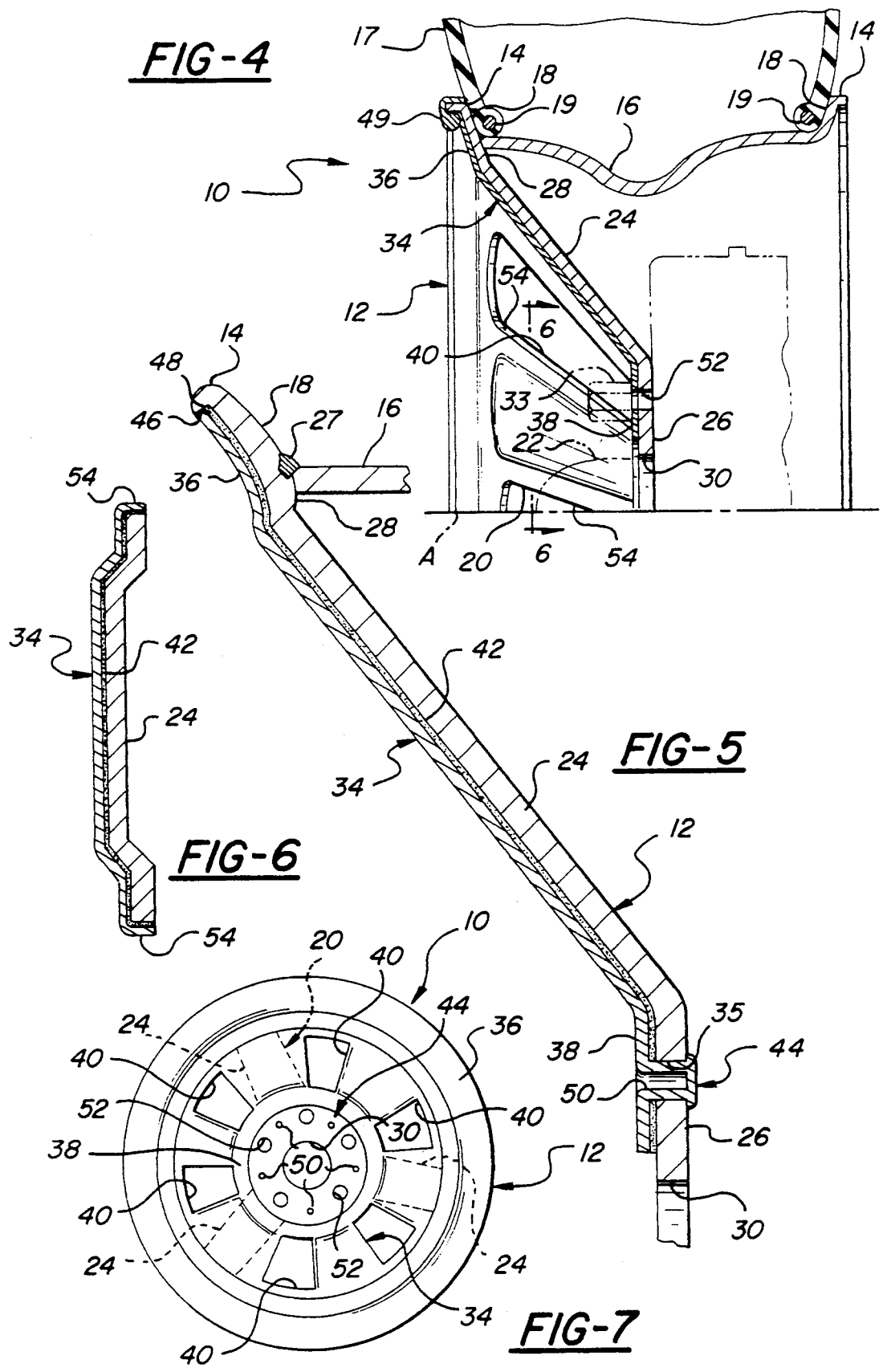

VEHICLE WHEEL CONSTRUCTION

TECHNICAL FIELD

The invention relates to a vehicular wheel, and more particularly to an ornamental vehicle wheel assembly of composite construction to simulate conventional chrome plate wheel assemblies.

BACKGROUND ART

Vehicular wheels are used in automobiles to interconnect the rotating hub and the rubber tire. The wheel is a generally annular member having a rim with a pair of spaced rim flanges for engaging the bead of the tire. A spider is fixed within the rim. The spider typically includes a plurality of spokes with interposed openings for aesthetic reasons and for venting air to the brakes. The spider also includes a plurality of lug stud holes for receiving lug studs protruding from the rotating hub. Lug nuts are threaded on the lug studs for securely clamping the wheel and tire to the rotating hub.

Automobiles are adorned by many motorists to project a fashion statement. In such attempts, the wheels are treated with various styling configurations to conform with popular tastes. Presently, the chrome-plated look is in style. The prior art is replete with examples of either steel wheels or aluminum wheels which are chrome-plated in an electro chemical bath to achieve the desired results.

Today, automobile manufacturers may pay the supplier approximately $50.00 for each chrome-plated steel wheel. However, the same steel wheel having a painted finish instead of a chrome-plated finish will cost under $20.00 each. A chrome-plated aluminum wheel may cost the manufacturer $80.00 each. However, the same aluminum wheel having a simple machined and clear-coated finish will only cost about $40.00 each. Accordingly, there is a steep additional cost for chrome plating both steel and aluminum wheels.

There are several factors contributing to the high additional costs for chrome-plated wheels over the same wheels having a nonchrome finish. First, most manufacturers of wheels do not typically chrome plate "in-house". Therefore the wheels must be shipped to a chrome plating specialist before final delivery to the automobile manufacturer. The administrative costs associated with shipping and handling the wheels to the chrome plating specialist are appreciable.

Second, the actual cost the chrome plating operation is high because chrome plating expenses are determined in large part upon the surface area of the part to be immersed in the electroplate bath. Because the entire wheel is dunked in the electroplating tank, a very large surface area attracts the chrome metal.

Third, and most importantly, an inordinately large amount of time and effort is required to prefinish the wheel prior to chrome plating. This is because, during the manufacture of steel wheels, welding operations and metal forming operations leave considerable surface imperfections on the outer surface of the wheel. Because chrome plating amplifies all surface imperfections, each wheel is manually and tediously finished and inspected to remove all surface flaws. To an even greater degree, considerable and extensive surface preparation is also required for aluminum wheels to be chrome-plated.

Various attempts have been made in the prior art to ornament the wheel while avoiding the usual expense of immersion chrome plating. For example, U.S. Pat. No.1,858,228 to Lyon, issued May 10, 1932, U.S. Pat. No. 1,985,378 to Lyon, issued Dec. 25, 1934 and U.S. Pat. No. 3,517,968 to Tully et al, issued Jun. 30, 1970, all disclose ornamental trim rings utilizing a formed sheet metal ring attached to the rim portion only of the wheel. In Lyon '228, the rim trim ring is held in place under compression along the outer edge of the rim flange. In Tully et al, '968, the trim ring is fastened in place with an adhesive. In none of these references does the trim ring extend to cover the spider portion of the wheel assembly. Thus, these prior art attempts to ornament the wheel do not simulate an actual chrome-plated wheel because the spider spoke section remains unchromed.

U.S. Pat. No. 3,669,501 to Derleth, issued Jun. 13, 1972, discloses a vehicle wheel assembly having the typical rim and spider members, with a decorative plastic skin extending over both the rim and spider portions and permanently attached thereto by a structural foam. Derleth discloses that the plastic skin may be chrome-plated. Although this construction would appear to provide an acceptable alternative to the prior art full immersion chrome plating of a steel or aluminum wheel, it is, in actuality, just as expensive or more expensive. This is because expensive plastic forming machinery is required to form the plastic skin and foam underlay. Additionally, it is well known that chrome plating over plastic has many disadvantages. The most significant of which is that, once the chrome begins to chip away from its substrate, the dull, unattractive plastic is revealed.

SUMMARY OF THE INVENTION AND ADVANTAGES

The subject invention provides a composite vehicular wheel assembly having a permanent ornamental surface treatment. The assembly comprises an annular rim defining a central axis and having a pair of spaced rim flanges. A spider is concentricly fixed within the rim for connecting to a rotating hub. The spider includes a plurality of spokes. An ornamental applique of uniform material thickness overlaps the rim and the spider. The applique has an annular outer connecting portion disposed adjacent one of the rim flanges and an annular inner connecting portion and a plurality of vent openings aligned between the spokes of the spider and located between the inner and outer connecting portions. An adhesive of substantially uniform thickness permanently bonds the applique to the rim and the spider along overlapping surfaces to achieve permanent fixation.

The subject invention overcomes the disadvantages of the prior art by forming the applique with a uniform thickness material so that forming can be inexpensively accomplished by simple stamping operations. Also, if desired, the applique can be chrome-plated or the like. Its thin, uniform thickness creates a relatively small surface area so that chrome plating costs are low. Further, the thin, light weight applique is much more easily shipped and handled during the chrome plating phase than the prior art full wheel. Also, the adhesive of uniform thickness can be easily applied to permanently bond the applique to the spider and rim without requiring costly machinery. When chrome plated, the ornamental applique covers the visible portions of the rim and spider so that the completed composite assembly is virtually indistinguishable from the conventional prior art chrome-plated wheel assemblies wherein the entire wheel is immersed in an electro-chemical bath.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a fragmentary cross-sectional view of the vehicular wheel assembly of FIG. 1;

FIG. 5 is an enlarged fragmentary cross-sectional view of the applique mounted on the spider and rim;

FIG. 6 is a cross-sectional view of spoke as taken along lines 6—6 of FIG. 4; and FIG. 7 is a front view of an alternative spoke and applique vent opening configuration.

DETAILED DESCRIPTION OF THE PREFERRED EMBODIMENT

Figure 1:
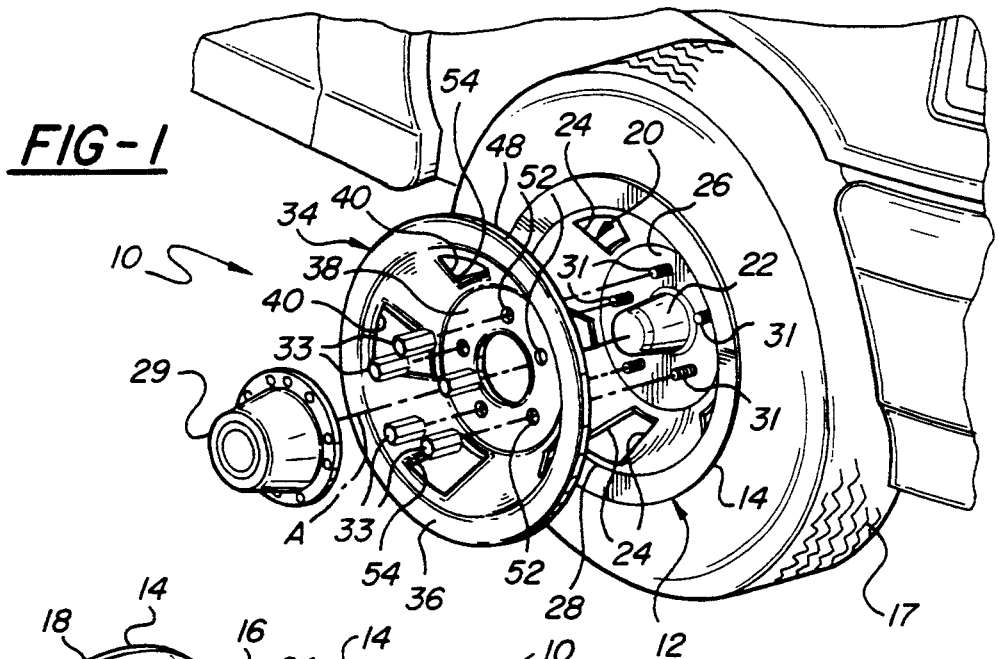
FIG. 1 is an exploded view of the subject vehicular wheel assembly with a tire mounted to the rim.

Referring to the Figures, wherein like numerals indicate like or corresponding parts throughout the several views, a composite vehicular wheel assembly according to the subject invention is generally shown at 10. The assembly 10 has a permanent ornamental surface treatment, preferably chrome-plated stainless steel, which eliminates the need for a separate detachable wheel cover. The wheel assembly 10 constructed in accordance with this invention is virtually indistinguishable from a prior art chrome-plated wheel assembly, yet more durable and substantially less expensive.

There are several general requirements for any wheel assembly having a permanent ornamental surface treatment. There must be an open center portion to receive the protruding portion of the hub and its dust cap. There must be access to the lug nuts. Tire mounting-/demounting machinery must be able to operate without damaging the ornamental surface treatment. The wheel assembly must be capable of receiving the standard clip-on balance weights at the rim flanges. There must be no sharp exposed edges. There can be no loose components which would cause vibration and noise. The ornamental surface treatment must be secured so that it will not become accidentally disassembled or stolen. The wheel assembly must be durable so that it will not rust or corrode. And finally, the permanent ornamental surface treatment must be economical relative to other prior art surface treatments and ornamentation.

Keeping these requirements in mind, the subject assembly 10 includes an annular rim, generally indicated at 12, defining a central axis A. The rim 12, as shown in FIG. 4, includes a pair of rim flanges 14 spaced on opposite sides of a well portion 16, over which a standard tube-type or tubeless tire 17 is mounted. A bead seat radius 18 is interposed between each of the rim flanges 14 and the well portion 16 for remaining the tire beads 19.

The spider, generally indicated at 20, is concentrically fixed within the rim 12 for connecting to a rotating hub 22. The spider 20 includes a plurality of spokes 24 which radiate from a center section 26 to a spoke flange 28. Venting spaces are interposed between adjacent spokes 24. The spoke flange 28 interconnects with the rim 12. However, these well-establish distinctions become somewhat obscured in the preferred embodiment where the assembly 10 is of the "full face" type, with the spider 20 extending integrally into the outer rim flange 14.

In this "full face" configuration, a weld line 27 is present at the one outer bead seat radius 18, as shown in FIG. 5. The effect of the weld line 27 is that considerable surface disturbance is created on the visible side of the assembly 10, in the area of the rim flange 14 and the spoke flange 28. In conventional prior art chrome plating situations, extensive surface preparation of this area of the wheel would be required due to the trauma induced by the weld line 27. That is, because chrome plating inherently amplifies all surface flaws, extra care would normally be required to prepare this area adjacent the weld line 27 prior to chrome plating the wheel.

Figure 2:
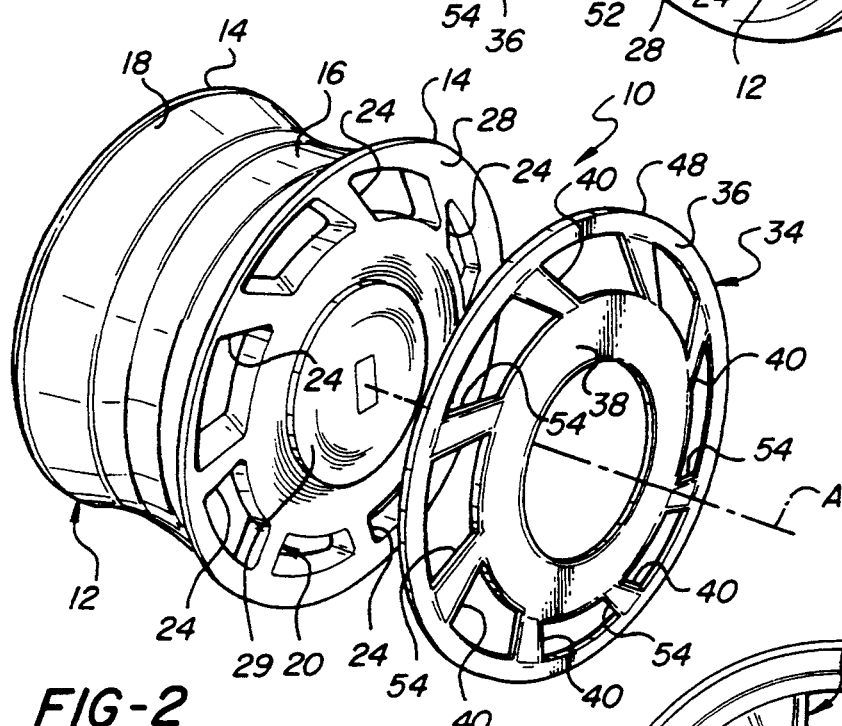
FIG. 2 is an exploded view of an alternative embodiment of the subject wheel assembly wherein the rim and spider portions are fabricated from aluminum.

The center section 26 of the spider 20 includes a center hole 30 for receiving the protruding portion of the hub 22 and its dust cap. As shown in FIGS. 1 and 2, various cap or cover 29 options are available for aesthetically trimming the center hole 30. In FIG. 1, the cover 29 for a steel wheel is generally frustroconical. In FIG. 2, the cover 29 for an aluminum wheel is a flat plate-like member.

Figure 3:
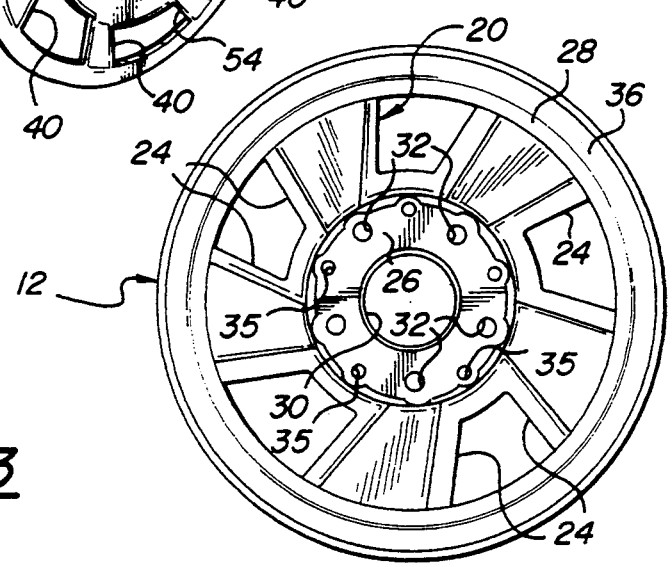
FIG. 3 is a front view of a steel rim and spider construction.

Disposed circumferentially about the center hole 30 are a plurality of lug stud holes 32. Standard threaded lug studs 31 extending from the hub 22 pass through the holes 32. The wheel assembly 10 illustrated in FIGS. 1 and 3 includes five such lug stud holes 32. In typical fashion, lug nuts 33 are threaded onto the studs 31 to secure the wheel assembly 10 to the hub 22. Between adjacent lug stud holes 32 is formed a hole 35 in the spider 20, extending completely through the material of the center section 26. Five such holes 35 are provided.

Preferably, the rim 12 and spider 20 sections of the assembly 10 are manufactured from fabricated steel, as shown in FIGS. 1 and 3-7. However, the same construction can be manufactured from fabricated aluminum to reduce weight. Alternatively, as shown in FIG. 2, the rim 12 and spider 20 sections can be manufactured from cast aluminum.

An ornamental applique, generally indicated at 34, is formed of a uniform thickness material, such as sheet steel or, preferably, stainless steel. The applique 34 overlaps the rim 12 and spider 20 to present an ornamental surface treatment to the visible outer portions of the assembly 10. The applique 34 has an annular outer connecting portion 36 disposed adjacent the one outer rim flange 14. The outer connecting portion 36 overlies the one rim flange 14 and the spoke flange 28 of the spider 20. The applique 34 also includes an annular inner connecting portion 38 overlying at least a portion of the center section 26.

Further, the applique 34 includes a plurality of vent openings 40 aligned between the spokes 24 of the spider 20. The vent openings 40 are radially positioned between the inner 38 and outer 36 connecting portions. Preferably, the vent portions 40 correspond precisely with the open portions between the spokes 24, as best illustrated in FIGS. 1–4. However, as shown in FIG. 7, the vent openings may vary from the spoke 24 configuration so that different and unique ornamental designs can be achieved. In some cases, the number of vent openings 40 need not be equal to the number of spokes 24. Thus, the rim 12 and spider 20 configuration of FIG. 7 can be used with many different vent opening 40 options of the applique. This practice allows the same rim 12 and spider 20 structure to be used for many different vehicles.

In the preferred embodiment, the applique 34 is fabricated from a uniform thickness material in a stamping operation. It will be readily appreciated that such a forming technique is quick, easy, and relatively inexpensive. Also, the durable sheet metal construction is ideal for plating with chrome. Because no welding operations are preformed on the applique 34 during its fabrication, the finishing operation to prepare the surface for chrome plating is relatively minor and thus inexpensive. Also, if the applique 34 is formed of stainless steel sheet stock, the favorable grain growth phenomena of the stamping process yields minimal surface defects. Further, the stainless steel provides an excellent bonding surface for the chrome, and will not corrode when portions of the chrome plating are subsequently chipped away. Thus, the subject invention provides a heretofore unavailable option, viz., a stainless steel substrate. Because stainless steel is much more expensive than the steels conventionally used for rim 12 and spider 20 constructions, the prior art could not practically consider chrome plating stainless steel with all its advantages. However, the applique 34 is small enough that stainless steel sheet stock can be used affordably. Thus, only with the subject invention can the benefits of a stainless steel substrate be realized.

Turning now to FIG. 5, it is shown that an adhesive 42 of substantially uniform thickness is provided for permanently bonding the applique 34 to the rim 12 and the spider 20 along overlapping surface areas. Preferably, the adhesive 42 is an epoxy material applied in a tacky, uncured condition between the rim 12 and spider 20. In practice, the adhesive 42 may be applied to the inner surface of the applique 34 or the outer surface of the rim 12 and spider 20. Favorable results have been achieved when the thickness of the adhesive 42 is less than twice the thickness of the applique 34. Alternatively, instead of using a glue type substance, the adhesive 42 may comprise double-sided tape or the like. Regardless of the specific adhesive 42 employed, it must be heat resistant so that its holding power is not compromised under high heat conditions.

When the adhesive 42 comprises an epoxy material, there is naturally a required drying or curing time. To aid in fixation, the subject invention further includes a locking means, generally indicated at 44 in FIG. 5, for mechanically locking the applique 34 to at least one of the rim 12 in the spider 20. The locking means 44 maintains the applique 34 in pressing, compressive contact with the adhesive 42 to ensure proper adhesion and thereby prevent the applique 34 from becoming disconnected from the rim 12 and spider 20 during operation.

The locking means 44 is shown in two forms which may be used independently or simultaneously. First, the locking means 44 may include an annular catch 46 formed in the one outer rim flange 14. A peripheral edge 48 of the outer connecting portion 36 of the applique 34 engages the annular catch 46 to hold the applique 34 in place while the adhesive 42 cures. Preferably, the peripheral edge 48 must be forced into engagement behind the catch 46 so that a spring-like pressure is exerted against the adhesive 42 by the applique 34. As shown in FIG. 4, this configuration will not restrict the use of conventional wheel balance weights 49 which clip over the periphery of the rim flanges 14.

Also, the locking means 44 includes a plastically deformed section 50 of the inner connecting portion 38. The plastically deformed section 50 is created by forcing the inner connecting portion 38 through one or more of the holes 35 in the center section 26 of the spider 20, i.e., the holes 35 between the lug stud holes 32. A swaging, pressing or extrusion process can be used to deform the applique 34 into the holes 35. As best shown in FIG. 5, the plastically deformed sections 50 may be peened in rivet-like fashion on the back side of the respective hole 35 to effect a structurally secure mechanical lock.

The inner connecting portion 38 of the applique 34 may or may not extend radially inwardly as far as the lug stud holes 32. If the inner connecting portion 38 extends over the lug stud holes 32, corresponding apertures 52 are aligned over each of the lug stud holes 32 to permit passage of the studs 31. The specific configuration of the cap 29 determines the inward extend of the inner connecting portion 38. FIG. 2 shows an embodiment of the invention where the inner connecting portion 38 does not extend over the lug stud holes 32, because the cap 29 completely covers the lug nuts 33.

In FIG. 6, a cross section of one spoke 24 is shown with the overlying portion of the applique 34. Of particular note is the boundary 54 of the vent openings 40 where the applique 34 is curled around the edges of the spokes 24. This construction further rigidifies the applique 34, eliminates sharp edges to prevent cuts, and also helps seal or protect the adhesive 42 from direct contact with debris and the elements. The curled boundary 54 further helps prevent the applique 34 from rotating upon the spider 20 and assists in the alignment of the applique 34 over the spider 20 during assembly.

The subject wheel assembly 10 is formed by the steps of forming the annular rim 12 with a pair of rim flanges 14, forming the spider 20 with a plurality of spokes 24 and interposed spaces, supporting the spider 20 concentrically within the rim 12, forming an ornamental applique 34 having a substantially uniform material thickness and an annular outer connecting portion 36 and an annular inner connecting portion 38, relieving a plurality of vent openings 40 in the applique 34 between the outer 36 and inner 38 connecting portions, positioning the applique centrally over the spider 20 and the rim 12 while aligning the applique vent openings 40 in the spaces between the spokes 24, compressing the adhesive 42 into a substantially uniformly thick space between the applique 34 and the spider 20, and mechanically maintaining the compressing step until the adhesive 42 is set.

The step of mechanically maintaining the adhesive in compression between the applique 34 and the spider 20 and rim 12 includes forming an annular catch 46 in the one outer rim flange 14, and force fitting the peripheral edge 48 of the applique 34 into the catch 46. Further, the adhesive 42 is maintained in compression under pressure of the applique 34 by plastically deforming a section 50 of the inner connecting portion 38 into the hole in the center section 26 of the spider 20.

The method further includes plating the applique 34 with a metallic composition containing a percentage of chromium prior to positioning the applique over the spider 20 and rim 12. This plating step is accomplished using well-known electro-plating technology.

The subject wheel assembly 10 as constructed in accordance with the preferred embodiment described above creates a functional and durable composite wheel assembly 10 having a permanent ornamental chromium surface treatment at a relatively low cost. The wheel assembly 10 is constructed to permit access of tire mounting equipment and the normal inclusion of balance weights 49 about the rim flanges 14. Further, the assembly 10 is permanently fixed so as to preclude theft of components or accidental loss of the applique 34. Further, the full surface adhesive 42 fixation technique creates an assembly 10 which will not vibrate between the applique 34 and the remainder of the assembly 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A composite vehicle wheel assembly (10) having a permanent, ornamental surface treatment, said assembly (10) comprising: an annular rim (12) defining a central axis (A) and having a pair of spaced rim flanges (14); a spider (20) concentrically fixed within said rim (12) for connecting to a rotating hub (22), said spider (20) including a plurality of spokes (24); an ornamental applique (34) of a uniform material thickness overlapping said rim (12) and said spider (20); said applique (34) having an annular outer connecting portion (36) disposed adjacent one of said rim flanges (14), an annular inner connecting portion (38) and a plurality of vent openings (40) aligned between said spokes (24) of said spider (20) and positioned between said inner (38) and outer (36) connecting portions; a curable adhesive (42) of substantially uniform thickness disposed between said applique (34) and said rim (12) and said spider (20) along overlapping surface areas; and locking means coacting between said applique (34) and said rim (12) for compressing said curable adhesive (42) between said applique (34) and said rim (12) and said spider (20) to hold said applique (34) in place while said adhesive (42) cures and for continued retention thereafter.

2. An assembly as set forth in claim 1 wherein said applique (34) comprises a sheet metal stamping.

3. An assembly as set forth in claim 2 wherein said applique (34) includes a metallic plating comprising a percentage of chromium.

4. An assembly as set forth in claim 3 wherein said applique (34) is fabricated from stainless steel sheet stock.

5. An assembly as set forth in claim 2 wherein said spider (20) includes a plurality of lug stud holes (32) circumferentially spaced about said central axis (A).

6. An assembly as set forth in claim 5 wherein said applique (34) includes an aperture (52) aligned over each of said lug stud holes (32).

7. An assembly as set forth in claim 2 wherein said adhesive (42) comprises an epoxy.

8. An assembly as set forth in claim 7 wherein said applique (34) has a substantially uniform thickness and said adhesive (43) has a substantially uniform thickness less than twice said thickness of said applique (34).

9. An assembly as set forth in claim 2 wherein said rim (12) includes a well portion (16) disposed between said rim flanges (14).

10. An assembly as set forth in claim 9 wherein said rim (12) includes a bead seat radius (18) interposed between each of said rim flanges (14) and said well portion (16).

11. An assembly as set forth in claim 2 wherein the number of said vent openings (40) is unequal to the number of said spokes (24).

12. An assembly as set forth in claim 1 wherein said locking means (44) includes an annular catch (46) formed in said one rim flange (14).

13. An assembly as set forth in claim 12 wherein said outer connecting portion (36) of said applique (34) includes a peripheral edge (48) engaging said annular catch (46) of said one rim flange (14).

14. An assembly as set forth in claim 1 wherein said locking means (44) includes a plasticly deformed section (50) of said inner connecting portion (38).

15. An assembly as set forth in claim 14 wherein said plasticly deformed section (50) extends through a hole (35) in said spider (20).

16. An assembly as set forth in claim 15 further including a plurality of said plastically deformed sections (50).

17. An assembly as set forth in claim 1 wherein said curable adhesive (42) is disposed entirely between all overlapping surface areas of said applique (34) and said rim (12) and said spider (20).

* * * * *